United States Patent
Doraiswamy et al.

(10) Patent No.: US 10,120,734 B1
(45) Date of Patent: Nov. 6, 2018

(54) APPLICATION PROGRAMMING INTERFACE AND SERVICES ENGINE WITH APPLICATION-LEVEL MULTI-TENANCY

(71) Applicant: Equinix, Inc., Redwood City, CA (US)

(72) Inventors: Vijaay Doraiswamy, Fremont, CA (US); Ramchandra Jayateerth Koty, Sunnyvale, CA (US); Purvish Purohit, Sunnyvale, CA (US); Mahendra Malviya, San Jose, CA (US); Mohit Mathur, Bedok (SG); Darel P. Lasrado, Punggol (SG); Manikandan Kaliyaperumal, Sunnyvale, CA (US); Premkumar Soman, Punggol (SG)

(73) Assignee: Equinix, Inc., Redwood City, CA (US)

( * ) Notice: Subject to any disclaimer, the term of this patent is extended or adjusted under 35 U.S.C. 154(b) by 44 days.

(21) Appl. No.: 15/250,187

(22) Filed: Aug. 29, 2016

(51) Int. Cl.
*G06F 9/54* (2006.01)
*G06F 21/44* (2013.01)

(52) U.S. Cl.
CPC .............. *G06F 9/541* (2013.01); *G06F 21/44* (2013.01)

(58) Field of Classification Search
None
See application file for complete search history.

(56) References Cited

U.S. PATENT DOCUMENTS

| | | | |
|---|---|---|---|
| 2006/0174334 A1* | 8/2006 | Perlin | G06F 21/6218 726/9 |
| 2010/0242097 A1* | 9/2010 | Hotes | G06F 9/468 726/4 |
| 2013/0024919 A1* | 1/2013 | Wetter | G06F 21/335 726/6 |
| 2013/0179450 A1* | 7/2013 | Chitiveli | G06F 17/30283 707/737 |
| 2013/0238641 A1* | 9/2013 | Mandelstein | G06F 17/303 707/756 |
| 2016/0127454 A1 | 5/2016 | Maheshwari et al. | |
| 2016/0308762 A1 | 10/2016 | Teng et al. | |
| 2016/0337473 A1 | 11/2016 | Rao | |

* cited by examiner

*Primary Examiner* — Syed Roni
(74) *Attorney, Agent, or Firm* — Shumaker & Sieffert, P.A.

(57) ABSTRACT

In some examples, an application programming interface (API) and services engine is configured to determine, in response to receiving a service request from an application, an application identifier for the service request based at least on an authorization token included in the service request, wherein the application identifier identifies an application that issued the service request; select, based at least on the application identifier, an application data store uniquely associated with the application that issued the service request; and process the service request using data stored by the selected application data store.

20 Claims, 9 Drawing Sheets

APPLICATION PROGRAMMING INTERFACE AND SERVICES ENGINE WITH APPLICATION-LEVEL MULTI-TENANCY

TECHNICAL FIELD

The invention relates to computer applications and, more specifically, to application programming interfaces and service delivery.

BACKGROUND

Application programming interfaces (APIs) allow companies to open their resources to internal or external customers in a secure and controlled way. Within an organization, internal APIs provide updatability, flexibility, and scalability as the organizational internal APIs facilitate access to data and functionalities of the organization's backend Information Technology (IT) systems according to well-defined API access rules.

Cloud computing refers to the use of dynamically scalable computing resources accessible via a network, such as the Internet. The computing resources, often referred to as a "cloud," provide one or more services to users. These services may be categorized according to service types, which may include, for example, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS), Platform-as-a-Service (PaaS), and Infrastructure-as-a-Service (IaaS), respectively.

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

SUMMARY

In general, this disclosure describes an application programming interface (API) and services engine that facilitates application-level, and in some cases user- or application data-level, multi-tenancy for a backend-as-a-service (BaaS) infrastructure. The API and services engine can be leveraged to build BaaS components for securely accessing Information Technology (IT) systems by multiple different applications. In some examples, an API gateway that exposes APIs for the BaaS components may identify a requesting application as part of a login operation for a user of the application. Thereafter, the API gateway may use an authorization token generated as part of the login operation to determine the requesting application from service requests issued to any of the APIs exposed by the API gateway, where such service requests include the authorization token, e.g., in a requested Uniform Resource Identifier (URI) string.

The API gateway may modify the service request to insert an application identifier mapped to the requesting application by the API gateway before relaying the modified service request to one of a plurality of shared service libraries for respective services provided by the API and services engine, such services including, e.g., caching, security, search, rules, and cloud service interfaces. Each of the shared service libraries may provide a library API to a corresponding distributed service engine executing on a distributed runtime platform executed by one or more servers. In some examples, a shared service library may execute on a distributed runtime platform executed by one or more server clusters, where each service engine of the distributed service engine manages a partition of a corresponding application-specific data store for each application that makes use of the API and services engine. The library API may, in this way, abstract complexities of the various service engines, in particular those complexities relating to enabling and enforcing application-level multi-tenancy to facilitate isolated accessibility by multiple applications.

Based on the modified service request including the embedded application identifier, a shared service library may determine the corresponding application data store for the application that sent the service request. In this way, the shared service library may help isolate application data stores for different applications for, e.g., improved security, data integrity, and/or data integration. Isolating applications may be particularly important when the API and services engine provides services for both customer-facing and internal-facing applications, to prevent exposure of private enterprise data to outside customers. Further, the shared service library may in some cases determine, based on a key embedded in the modified service request, a particular partition of the corresponding and distributed application data store managed by a server cluster of the plurality of server clusters. In this way, the shared service library may consistently load balance different application users to the server clusters.

In some examples, a method comprises determining, by an application programming interface (API) and services engine in response to receiving a service request from an application, an application identifier for the service request based at least on an authorization token included in the service request, wherein the application identifier identifies an application that issued the service request; selecting, by the API and services engine based at least on the application identifier, an application data store uniquely associated with the application that issued the service request; and processing, by the API and services engine, the service request using data stored by the selected application data store.

In some examples, an application programming interface (API) and services engine comprises one or more programmable processors operably coupled to at least one memory, the at least one memory configured with instructions for causing the one or more programmable processors to: determine, in response to receiving a service request from an application, an application identifier for the service request based at least on an authorization token included in the service request, wherein the application identifier identifies an application that issued the service request; select, based at least on the application identifier, an application data store uniquely associated with the application that issued the service request; and process the service request using data stored by the selected application data store.

In some examples, a non-transitory computer-readable medium comprising instructions for causing one or more programmable processors for an application programing interface and services engines to perform operations comprising determining, in response to receiving a service request from an application, an application identifier for the service request based at least on an authorization token included in the service request, wherein the application identifier identifies an application that issued the service request; selecting, based at least on the application identifier, an application data store uniquely associated with the application that issued the service request; and processing the service request using data stored by the selected application data store.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
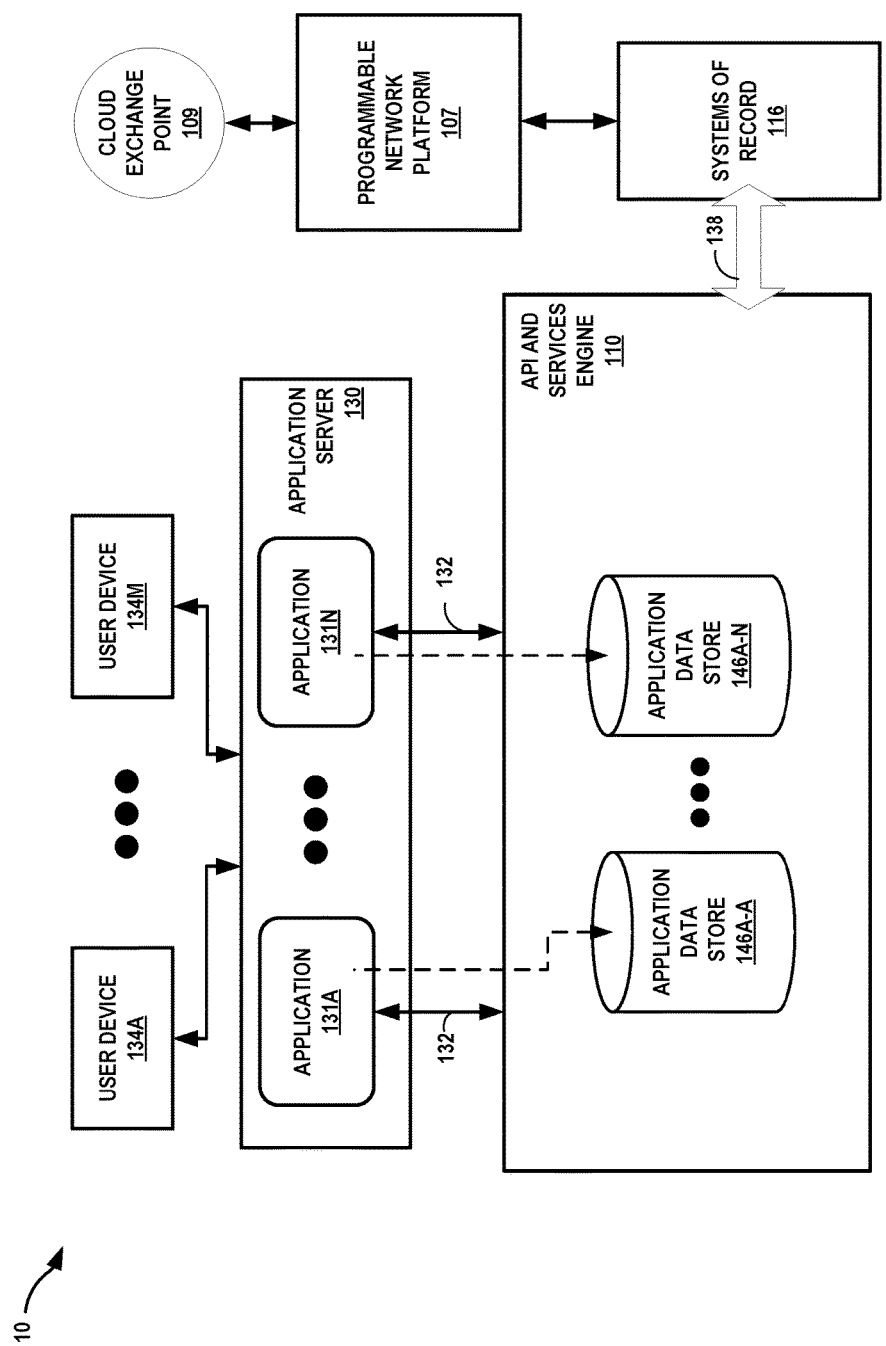
FIG. 1 is block diagram illustrating an application architecture for an application programming interface (API) and services platform, according to techniques described in this disclosure.

FIG. 1 is block diagram illustrating an application architecture for an application programming interface (API) and services platform, according to techniques described in this disclosure. API and services platform 10 includes an application server 130 and API and services engine 110. Application server 130 may represent one or more real or virtual computing devices that provide an application execution platform for multiple applications 131A-131N (collectively, "applications 131"). Each of applications 131 may represent a different system of engagement (SoE) developed for and deployed to the API and service platform 10 and utilizing the API and services engine 110. In general, any of applications 131 that is an SoE is highly reactive (i.e., responsive, scalable, resilient, and event driven) as well as highly interactive and user friendly.

Enterprise systems of record (SoRs) 116 represents multiple systems, each typically including a multi-tier system of databases, applications, and interfaces, that may be highly-transactional, consistent, and strictly adhere to auditing and compliance policies. Interacting with multiple SoRs in a distributed enterprise can be challenging due to non-uniform (i.e., across the various SoRs) user management and non-uniform (or complete lack of) native SoR services for such functions as data storage, caching, rules, search, and security.

In accordance with techniques described herein, applications 131 communicate with SoRs 116 via API and services engine 110 to enable SoE applications 131 to integrate with SoRs 116 via simplified abstractions and APIs. Whereas multiple SoRs 116 may present highly diverse and in some cases esoteric interfaces with limited service capabilities, API and services engine 110 augments the SoRs 116 to provide a more uniform and API-enabled access interface, via respective custom adapters for abstracting the underlying SoRs 116, and to enhance the services available to applications 131 for integrating with SoRs 116. Such services may include data storage, caching, rules, search, security, location services, and/or user management.

In this way, the API and services engine 110 may operate as a gateway to enable SoE applications 131 to integrate with SoRs 116 via simplified abstractions and APIs. The API and services engine 110 may include a "core services" infrastructure that operates the abstracted APIs for SoR 116.

In accordance with techniques described herein, API and services engine 110 enables a multi-tenant (e.g., application-level for multiple applications 131) BaaS infrastructure to facilitate the isolation of application data stores 146A-A-146A-N for different applications 131 for, e.g., improved security, data integrity, and/or data integration. Developers may leverage these capabilities to build BaaS components for any of the above-identified core services to enhance the operability of applications 131 with respect to SoRs 116.

API and services engine 110 exposes software interfaces defined according to APIs 132. The applications may invoke services of API and services engine 110 that correspond to endpoints of the APIs 132, and API and services engine 110 directs each service request issued to endpoints to the application data store 146 for the application 131 that originated the service request. APIs 132 may represent a (Representational State Transfer) RESTful interface with multiple endpoints.

In this way, data in application stores 146 for applications 131 can be segregated and support multi-tenancy. That is, API and services engine 110 shared among a plurality of applications may facilitate the isolation of application data stores 146 for the different applications 131 for, e.g., improved security, data integrity, and/or data integration.

Figure 2:
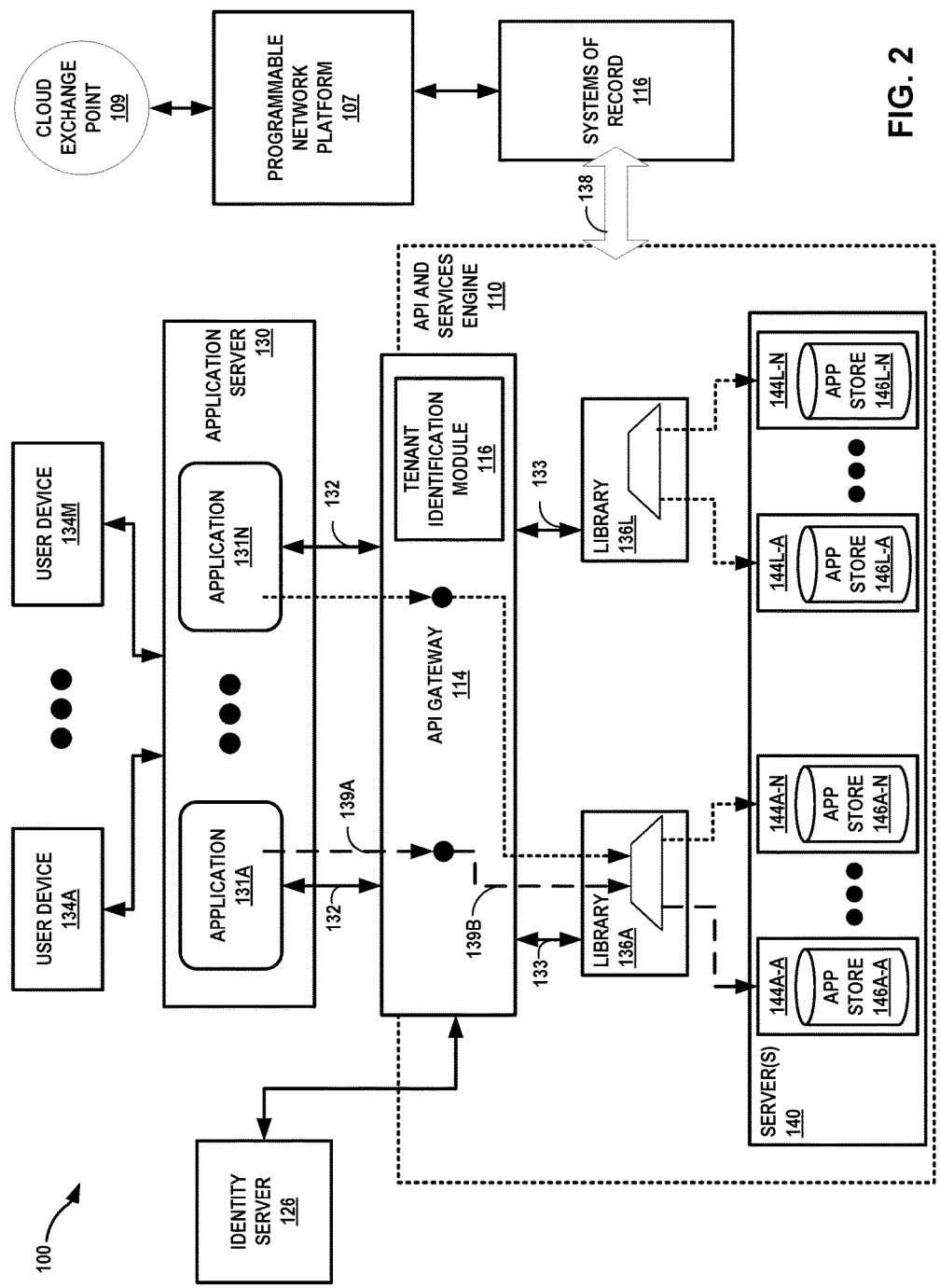
FIG. 2 is block diagram illustrating an application architecture for an application programming interface (API) and services platform, according to techniques described in this disclosure.

FIG. 2 is block diagram illustrating an application architecture for an application programming interface (API) and services platform, according to techniques described in this disclosure. API and services platform 100 illustrates an example of API and services engine 110 in further detail. The API and services engine 110 includes respective libraries 136A-136L (collectively, "libraries 136") for the core services, which may be leveraged by any of SoE applications 131 for improving engagement with SoRs 116 by enhancing the capabilities of the applications 131. Moreover, API gateway 114 in combination with each of libraries 136 enables a multi-tenant (e.g., application-level for multiple applications 131) BaaS infrastructure to facilitate the isolation of application data stores 146 for different applications 131 for, e.g., improved security, data integrity, and/or data integration. Developers may leverage these capabilities to build BaaS components for any of the above-identified core services to enhance the operability of applications 131 with respect to SoRs 116.

API and services engine 110 includes one or more servers 140 that execute one or more of the service engines 144 for core services infrastructure. Each of the servers 140 may represent, for instance, a virtual machine, container, or real server. In some instances, each of the servers 140 represents a real server and may execute multiple virtual machines or containers, e.g., for respective service engines 144. Each of the servers 140 may execute a server application platform for executing applications, such as TOMCAT.

Service engines 144A-A-144L N (collectively, "service engines 144") each provides one of the core services for API and services engine 100 to, e.g., support enhanced interoperability of SoE applications 131 with SoRs 116. Service engines 144 may each include a runtime container for executing one or more applications to provide the corresponding service. Multiple service engines may support a single distributed service in some cases. In such cases, a load balancer (not shown in FIG. 2) for a service may distribute service requests originated by application 131 for the service among the multiple service engines.

In the example of FIG. 2, service engines 144A-A-144L-N represent distributed service engines for a single service, e.g., any one of the data storage, security, cache, rules, and search services. Service engines 144A-A-144A-N represent distributed service engines for another service, and so on.

Each service engine 144 uses a corresponding application data store 146 for storing application data to support the service provided by the service engine. Each of application data stores 146 is a repository for persistently storing and managing collections of data, such as simple data files, data structures, user profiles, tables, records, configuration data for a cloud exchange or data center, sales or billing data, and so forth. Application data stores 146 may include a database.

API and services engine 110 may provide many different types of core services to support enhanced interoperability of SoE applications 131 with SoRs 116. In some instances, a search service provided by one or more service engines 144 may facilitate enhanced searching by applications 131 of data stored by SoRs 116. The search service may index or map such data or otherwise analyze such data and store search data structures to enable enhanced search of such data by applications 131. Search engines of service engines 144 may store the search data structures to respective application data stores 146. Search engines may execute APACHE SOLR to provide the search service in some examples.

In some instances, a rules service provided by one or more service engines 144 may facilitate rules-based access by applications 131 to data stored by SoRs 116. To enforce such rules-based access, rules service engines of service engines 144 may read and apply rules stored to respective application data stores 146. Rules service engines may execute DROOLS to provide the rules service, in some examples.

In some instances, a cache service provided by one or more service engines 144 may facilitate caching for lower-latency access to frequently-accessed data stored by SoRs 116. Cache engines of service engines 144 may obtain data from SoRs 116 via APIs 138, cache the data to respective application data stores 146, and subsequently read the cached data from application data stores 146. Cache engines may execute EHCACHE to provide the cache service in some examples.

In some instances, a security service provided by one or more service engines 144 may apply security operations to service requests and/or service responses processed by API and services engine 110. Security service engines of service engines 144 may store and access security-related data using respective application data stores 146. Security engines may execute APACHE SHIRO to provide the security service in some examples.

In some instances, a data storage service provided by one or more service engines 144 may store and retrieve data for any of applications 131. Data storage engines of service engines 144 may store and retrieve such data using respective application data stores 146.

Other services that may be provided by search engines 144 in various instances may include login and logout services, content services, database connect services, and data center services to enable real-time information describing configuration and operations of one or more data centers.

In accordance with techniques described herein, each of application data stores 146 is an application-specific application data store. That is, each application data store 146 stores service data for a particular service for a single one of applications 131 to provide application-level data isolation among the applications 131 for each of the services provided by API and services engine 110. For example, the N service engines for the service (e.g., search) provided by distributed service engines 144A-A-144A-N store service data for respective applications 131A-131N. Service engine 144A-A stores service data for a service for application 131A, service engine 144A-B stores service data for the same service for application 131B, and so on through service engine 144A-N stores service data for the same service for application 131N. Because in the example of FIG. 2, each service engine 144 accesses data stored to a corresponding application data store 146, the service data for the service for each of applications 131 is stored to a separate, isolated data store. Application data stores 146 are thus application-specific. In some cases, multiple distributed application data stores may store data for a single service for a single application 131, but each application data store 146 is associated with at most one application 131 and one service (and one service library 136). In some cases, a single virtual machine or real server may support multiple service engines 144 for a single service. In some cases, service data may be replicated to multiple application data stores 146.

To enable and enforce and application-specific application data stores to support service requests originated by applications 131, API gateway 114 and libraries 136 are configured to identify the application 131 from a service request and to route a service request to a service engine 144 and the corresponding application-specific (or alternatively hereinafter, "tenant-specific") application data store 146 for the identified application for the service being requested.

API and services engine 110 includes an API gateway 114 having one or more processors that executes one or more applications that expose software interfaces defined according to APIs 132. The applications may invoke services of libraries 136 that correspond to endpoints of the APIs 132, and API gateway 114 directs service requests issued to endpoints to the corresponding libraries 136 for the endpoints. APIs 132 may represent a RESTful interface with multiple endpoints. API gateway 114 may execute on a management device such as one or virtual machines and/or real servers. Although shown as a single element in FIG. 2, API gateway 114 may comprise a cluster of one or more physical and/or virtual computing machines executing on one or more physical processors. API gateway 114 may represent an APIGEE-based API gateway extended according to techniques described herein to provide multi-tenancy in cooperation with libraries 136.

API and services engine 110 includes respective libraries 136A-136L for the core services. Each of libraries 136 exposes a service-specific library API for the service. For example, library 136A may expose a library API for a search service that presents API endpoints (or other types of API methods or interfaces) that usable for requesting and receiving search-related services. Library 136B may expose a library API for a security service, and so on.

Libraries 136 may execute on one or more application platforms, executed by one or more servers (not shown in FIG. 2). In some examples, the application platform is a PLAY server executed by a real or virtual server (e.g., a Java virtual machine (VM)). PLAY is a lightweight full stack web development framework. PLAY may be built over AKKA (a highly-concurrent, distributed, and fault-tolerant event-driven framework) and use NETTY I/O to facilitate non-blocking API call handling.

API gateway 114 includes a tenant identification module 116 that identifies tenant applications and enables libraries 136 of API and services engine 110 to access corresponding application-specific data stores 146 served by servers 140. Tenant identification module 116 maps authentication tokens for logged-in users of applications 131, and included in service requests to API and services engine 110, to the applications 131 that issue the service requests.

To access API and services engine 110 to use the APIs 132, applications 131 may be validated and authorized and users of user devices 134 may be authenticated. API gateway 114 authenticates and authorizes a user for access to API and services engine 110 APIs 132. One of APIs 132 may include a login API or other interface. For example, application 131A may present a login page to user device 134A to receive login information from a user. Application 131A may be configured with an application-specific API key (also known as a "client ID" or "API consumer key") and API secret (also known as a "client secret" or "API consumer secret"). The API key and API secret may be pre-generated by API gateway or another entity and configured in application 131A. Applications 131 are configured with respective application-specific API keys and API secrets that differ from those of application 131A. Application 131A may pass login information, such as one or more of a user name and password, together with the API key and API secret for application 131A, to API gateway 114. API gateway 114 may invoke an application authorization task to perform API key and API secret validation using identity server 126 as an identity provider. API gateway 114 may receive and provide an API authorization token (such as an OAuth 2.0 authorization token) back to the user application 131A for future invocations of APIs 132.

In some cases, API gateway 114 can send a user name and password received from application 131A, after validation of the application 131A using the provided API key and API secret, to identity server 126, which returns a user name and user key for the user of application 131A. Identity server 126 may perform Security Assertion Markup Language (SAML) to OAuth mapping, and may provide an OAuth token to API gateway 114. In some examples, API gateway 114 may perform an OAuth Token to Gateway OAuth 2.0 mapping, and may optionally perform an XML/JSON conversion. API gateway 114 then provides the OAuth 2.0 token to application 131A. Application 131A may subsequently invoke an API 132 endpoint by providing the OAuth 2.0 token and one or more parameters to API gateway 114. API gateway 114 may perform a data format transformation (e.g., XML, JSON) and OAuth 2.0 token validation. API gateway 114 then invokes the service identified by the API endpoint in the service request, as described in further detail below.

The following are example API endpoints of API 132 and JSON-formatted example responses for the example API endpoints.

Login API

TABLE 1

| Login API | |
|---|---|
| METHOD | POST |
| API | fase/login |
| URL | http://domain.com/fase/login |
| HEADER | Content-Type : application/json apikey : |
| DESCRIPTION | Creates a new session for a user in the system. |
| VERSION | 1.0 |

Sample Request
{
  "username": "user1",
  "password": "#Welcome123$"
}
Sample Request URL
POST http://<HOST>:<PORT>/fase/jira/login
Sample Response for Successful Login
{
  "session": {
  "name": "JSESSIONID",
  "value": "0235F3B66E0CF01A614AAAE029097EDF"
  "OAuthToken": [token-value]
  }
  "loginInfo": {
  "failedLoginCount": 1,
  "loginCount": 52,
  "lastFailedLoginTime":    "2015-08-27T04:00:12.926-0700",
  "previousLoginTime":    "2015-10-29T12:17:36.632-0700"
  }
}
Sample Response for Unsuccessful Login
HTTP 400 BAD REQUEST
Content-Type: APPLICATION/JSON
{
  "errorMessages": [
  "Login failed"
  ],
  "errors": { }
}
Logout API

TABLE 2

| Logout API | |
|---|---|
| METHOD | POST |
| API | fase/login |
| URL | http://domain.com/fase/logout |
| HEADER | Content-Type : application/json apikey : |
| DESCRIPTION | Logs the current user out of the system, destroying the existing session, if any. |
| VERSION | 1.0 |

To call the Logout API, the JSESSIONID from the Login API response and its value should be passed in the Cookie header.
Sample Request:
DELETE: http://<HOST>:<PORT>/fase/logout
Headers: {Cookie: JSESSIONID=value}
Sample Response:
204: Returned if the user was successfully logged out.
401: Returned if the caller is not authenticated.

Identity server 126 may include an authorization server. Identity server 126 may be accessible to API gateway 114 via one or more APIs. In some examples, identity server 126 represents a PING server operating as an identity manager for API and services engine 110.

API gateway 114 stores a mapping of API key and, in some cases, the API secret for an application 131 to an application identifier that identifies the application 131. In accordance with techniques described herein, tenant identification module 116 uses the mapping to generate a tenant mapping of each API authorization token for users to the authorized application 131. For example, API gateway 114 may store the API key and API secret for each of applications 131. On receiving a login service request from application 131A for a user, for instance, and obtaining an application authorization token for the application 131A for the user and responsive to the login service request, tenant identification module 116 may map the API key (and in some cases, the API secret) received in the login service request to the application identifier that identifies application 131A and generate a tenant mapping of the application authorization token to the application identifier. Because subsequent service requests to API gateway 114 via API 132 include the application authorization token, tenant identification module 116 may subsequently identify the application 131A (i.e., the tenant for service requests) using the tenant mapping.

Tenant identification module 116 may use tenant mappings to enable API gateway 114, in response to service requests received via APIs 132, to generate service requests to libraries 136 that include the application identifier, which libraries 136 may use to access the application-specific application data store 146 for the identified application. In the example of FIG. 2, application 131A generates and sends a service request 139A to an API 132 endpoint that invokes the library 136A. Service request 139A may represent an HTTP request to an endpoint of APIs 132 and may include a JavaScript Object Notation (JSON) or eXtensible Markup Language (XML) request. Service request 139A includes application authorization token previously obtained by application 131A. Other than the application authorization token, service request 139A may not, at least in some examples, include any data usable for identifying application 131A.

API gateway 114 receives service request 139A, and tenant identification module 116 uses the tenant mappings to map the application authorization token included in service request 139A to the application identifier for application 131A. API gateway 114 uses the application identifier to generate the service request 139B to include the application identifier. API gateway 114 modifies and directs received service requests originated by applications 131 to libraries 136 for processing. API gateway 114 generates service request 139B based on service request 139A. Unlike service request 139A, however, service request 139B includes the application identifier determined by tenant identification module 116. In this way, API gateway 114 enables application-level multi-tenancy for API and services engine 110 by allowing libraries 136 to identify the application-specific application store 146 for an application 131 that issued a service request to API gateway 114.

In some examples, service request 139B is an HTTP request that includes the application identifier in the Uniform Resource Identifier of an HTTP header. In some examples, service request 139B includes the application identifier within a JSON or XML object.

Library 136A receives service request 139B and, based on the application identifier for application 131A, processes the service request 139B using application store 146A-A that is associated with application 131A. In this way, data in application stores 146 for application 131A can be segregated and support multi-tenancy. Application store 146A-A may be uniquely associated with application 131A. In some examples, library 136A may process the service request 139B using only application store 146A-A and not any of the other application stores 146. As described below with respect to FIG. 4, library 136A may determine the application store 146A-A for processing service request 139B based on configuration data for a tenant (application 131A) that identifies the application store 146A-A (or service engine 144A-A) for application 131A.

In this way, data in application stores 146 for application 131A can be segregated and support multi-tenancy. That is, API gateway 114 and libraries 136 shared among a plurality of applications may facilitate the isolation of application data stores 146 for the different applications 131 for, e.g., improved security, data integrity, and/or data integration.

Application 131A may in some cases represent a marketing application, a finance application, or other application for operating and marketing a cloud exchange or other interconnection facility. In the example of FIG. 2, system 100 includes a cloud exchange point 109 that is configurable by a programmable network platform 107.

The operations of programmable network platform 107 may be based at least in part on systems of record 116. For example, SoRs 116 may store and manage customer data for customers co-located within a data center that includes cloud exchange point 109 in order to deliver or receive cloud services to or from other customers. SoRs 116 may further include configuration data that determines provisioning, by programmable network platform 107, of interconnections within cloud exchange point 109. Using techniques described herein, an application 131 for obtaining or storing data of systems of records 116 to manage cloud exchange point 109 may use API and services engine 110 to isolate the application data to an application-specific data store 146.

Further example details of a facility that provides a cloud-based services exchange are found in U.S. patent application Ser. No. 15/099,407, filed Apr. 14, 2016 and entitled "Cloud-Based Services Exchange;" and in U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" and U.S. patent application Ser. No. 15/001,766, filed Jan. 20, 2016 and entitled "Multi-cloud, Multi-service Data Model." Each of the above patent applications are incorporated herein by reference in their respective entireties. In some examples, cloud exchange point 109 may be a cloud exchange point as described in the above-referenced patent applications.

Figure 3:
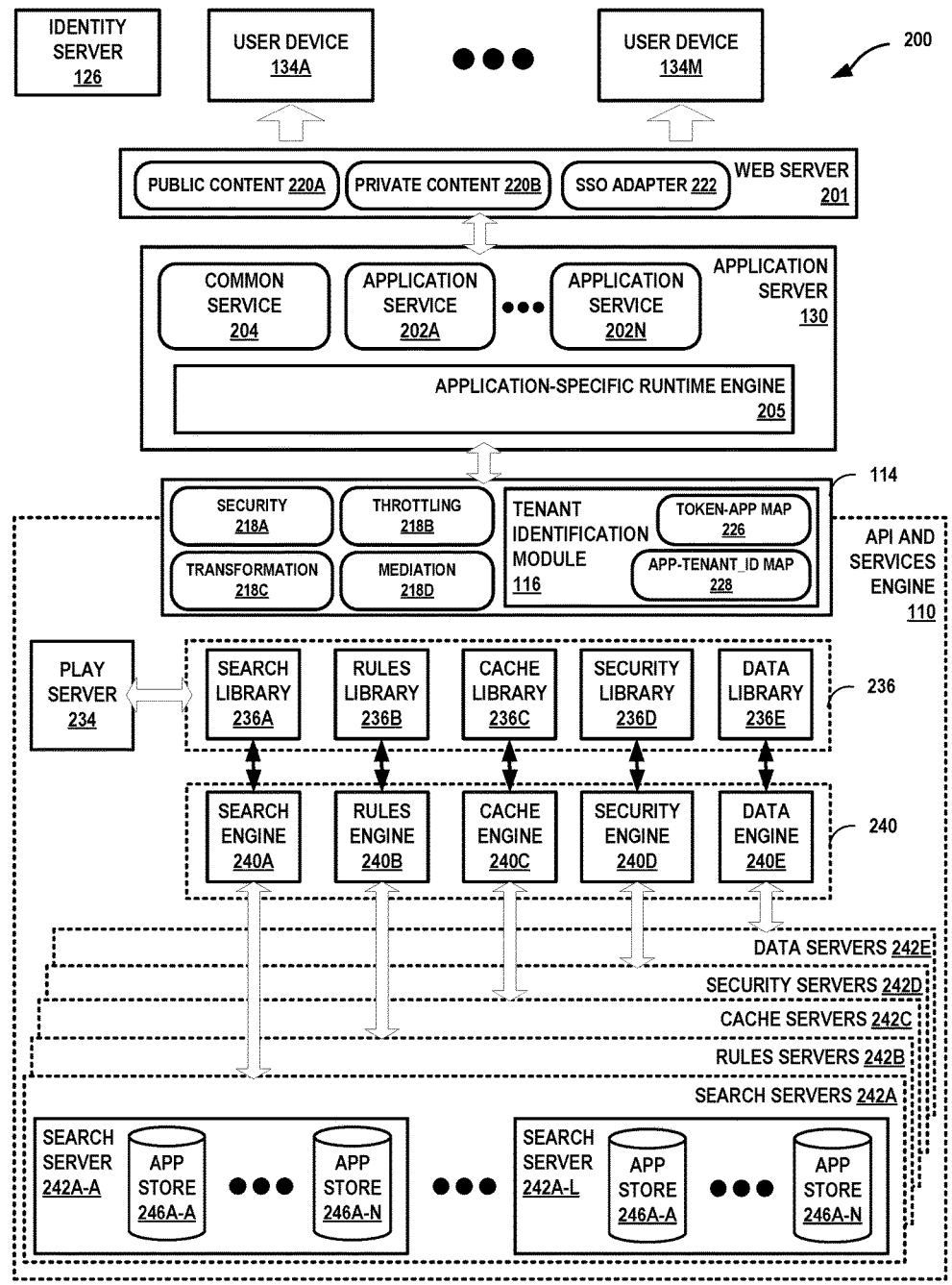
FIG. 3 is a block diagram illustrating, in further detail, an application architecture for an application programming interface (API) and services platform, according to techniques described in this disclosure.

FIG. 3 is a block diagram illustrating, in further detail, an application architecture for an application programming interface (API) and services platform, according to techniques described in this disclosure. Application architecture 200 may represent an example instance of application architecture 100 of FIG. 2. Application architecture 200 includes a web server 201 operating in tandem with application server 130. Web server 201 is an HTTP server and handles HTTP requests from user devices 134 and delegates HTTP requests to services 202, 204 of application server 130. Web server 201 implements separate channels for public content 220A and private content 220B. Web server 201 also includes and executes a single sign-on (SSO) adapter 222 to provide SSO integration with identity server 126 for single sign-on by users of user devices 134. SSO adapter 222 may in some examples store authorization tokens for users authorized to identity server 126 and include the authorization tokens in service requests relating to content 220A, 200B served to user devices 134. For example, SSO adapter 222 may store OAuth client records that include authorization tokens.

Application server 130 executes common service 204 and multiple application services 202A-202N (collectively, "application services 202"). Applications services 202 may represent example instances of respective applications 131 of FIGS. 1-2. Each of application services 202 may represent a servlet or JavaServer Page, an ASP.NET, PHP, Python, or other type of application service. Application-specific runtime engine 200 is a runtime framework for executing common server 204 and applications services 202, such as IBM WebSphere, TOMCAT, JBOSS, or another Java application server framework, or such as .NET Framework from Microsoft, a Python or PHP framework, or other application runtime engine. In some examples, each of application services 202 and common service 204 may execute on a different instance of application-specific runtime engine 200.

In the example of FIG. 3, API gateway 114 provides security 218A, throttling 218B, transformation 218C, and mediation 218D. Tenant identification module 116 includes a token-application map 226 (illustrated as "token-app map 226") and an application-tenant identifier map 228 ("illustrated as "app-tenant_id map 228"). Token-application map 226 represents an associative data structure accessible by API gateway 114 and includes one or more records that each maps an authorization token to an application name for one of application services 202. Authorization tokens may be OAuth access tokens, for instance. API gateway 114 may receive an authorization token from identity server 126 as part of a login operation by one of application services 202. Based on a API consumer key and/or API consumer secret included in a login service request for a login API of API gateway 114, which are uniquely associated with one of application services 202, API gateway 114 may generate a new record for token-application map 226 to map the authorization token to an application name for the application service 202.

Application-tenant identifier map 228 represents an associative data structure accessible by API gateway 114 and includes one or more records that each maps an application name to a tenant identifier. A tenant identifier is usable by libraries 236 as executed by service engines 240 to identify a particular application data store 246 for the application service 202 corresponding to the tenant identifier. A tenant identifier may be an example of an application identifier. Tenant identification module 116 uses token-application map 226 to identify application services 202 that originate service requests and generate corresponding service requests for libraries 236 that include a tenant identifier (or "store name") usable by the libraries 236 for identifying an application data store 246.

PLAY server 234 provides an execution environment for libraries 236, which in application architecture 200 include search library 236A, rules library 236B, cache library 236C, security library 236D, and data library 236E. Each of libraries 236 may execute on a different instance of PLAY server 234.

Servers 242 store application-specific application data stores 246A-A-246E-N (collectively, "application data stores 246"). Search servers 242A-A-242A-L ("search servers 242A") execute search engine 240A. Rules servers 242B-A-242B-L ("rules servers 242B") execute rules engine 240B. Cache servers 242C-A-242C-L ("cache servers 242C") execute cache engine 240C. Security servers 242D-A-242D-L ("security servers 242D") execute security engine 240D. Data servers 242E-A-242E-L ("data servers 242E") execute data engine 240E. Each of service engines 240 may represent an example instance of any of service engine 240 of FIG. 2. Each of search servers 242 may represent a TOMCAT server that executes at least one instance of one of service engines 240. Each of servers 242 may represent a different real server or virtual machine.

In the illustrated example, application data stores 246 are replicated across L servers. For instance, application store 246A-A is replicated to each of search servers 242A-A-242A-L. As described in further detail below with respect to FIG. 4, a load balancer may balance service requests from each of libraries 236 among the multiple servers 242 that execute the service engine corresponding to the service library 236. For example, a load balancer may balance service requests from search library 236A across the multiple search servers 242A-A-242A-L that each executes an instance of search engine 240A. In some examples, each of servers 242 may execute a separate service engine 240 for each application store 246 managed by the server. For example, search server 242A-A may execute N search engines 240A, one for each of application stores 246A-A-246A-N. The number of search servers and application stores depicted is merely an example. Different services may be executed by a differing number of servers 242.

Libraries 236 receive service requests from API gateway 114 and, using the tenant identifier included therein, determine and select from among service engines 240 to process the service requests in order to facilitate tenant isolation for application data stores 246. For example, API gateway 114 may receive a service request originated by application service 202A. Based on an authorization token included in the service request, tenant identification module 116 may use token-application map 226 to map the authorization token to an application name for the application service 202A. Tenant identification module 114 may use application-tenant identifier map 228 to map the application name to a tenant identifier (or "application data store name" in some cases). API gateway may then generate a new service request for the service request, wherein the new service includes the tenant identifier. Search library 236A receives the new service requests, extracts the tenant identifier, and directs the service request to the service engine 240A that manages the application data store 246A that manages application data for the application service 202A associated with the tenant identifier. As described in further detail below with respect to FIG. 4, each of libraries 236 may access configuration data that specifies a location for the corresponding service engine 240 for a given tenant identifier (or application data store name) to enable the library to direct the servicer request to the appropriate service engine.

Figure 4:
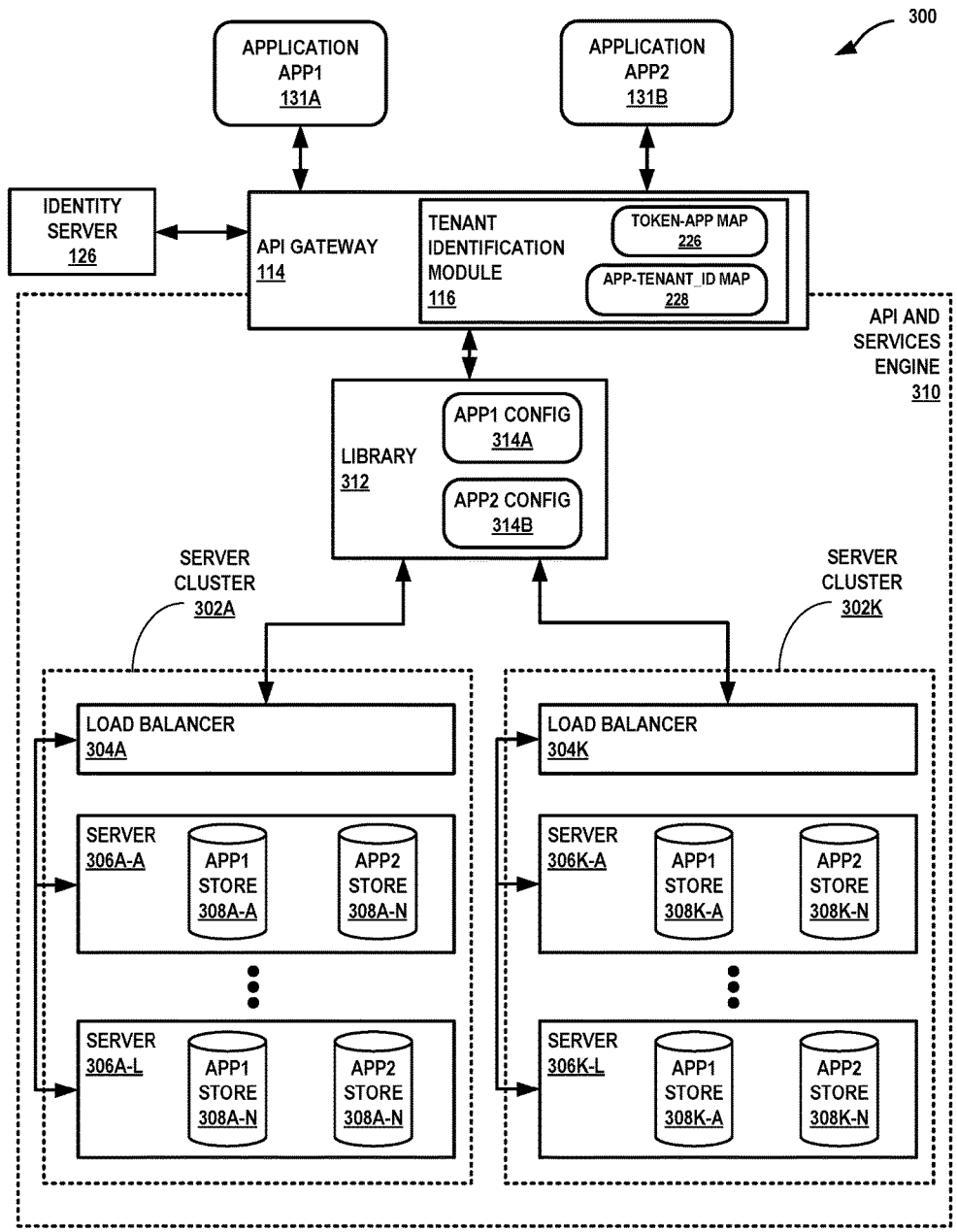
FIG. 4 is a block diagram illustrating, in further detail, an example application architecture for an API and services engine according to techniques described in this disclosure.

FIG. 4 is a block diagram illustrating, in further detail, an example application architecture 300 for an API and services engine 310 according to techniques described in this disclosure. For ease of illustration, a single library 312 and server clusters 302 for a corresponding service for the library 312 are shown. API and services engine 310 may include components according to the example application architecture 300 to support multiple different core services for systems of engagement. API and services engine 310 may represent an example instance of API and services engine 110.

API and services engine 310 in the example application architecture 300 provides both application-level (or "tenant-level") and application data-level multi-tenancy. API and services engine 310 includes K server clusters 302A-302K each having one or more servers 306 and each load balanced by one of load balancers 304A-304K. Servers 306 within a server cluster 302 may have replicated application data stores 308. Although not illustrated, each of servers 306 may execute separate service engine servers for each application data store 308 managed by the server.

With respect to enabling and enforcing application-level multi-tenancy, API gateway 114 and library 312 operate similarly to that described above with respect to API and services engine 110 of FIGS. 1-2. Library 312 includes configuration data for applications 131A, 131B. App1 configuration data 314A for application 131A specifies locations of application data stores 308 for application 131A. Application 131A may have application data stores ("APP1 stores" 308) managed by one or more server clusters 302. Each such application data store 308 for application 131A located in a different cluster includes a partition (or "shard") of an overall application data store 308. For example, APP1 store 308A-A through APP1 store 308K-A may include respective partitions of the overall application data store for application 131A. The above description applies similarly with respect to application 131B and APP2.

To enable and enforce application data-level partitioning, for a service request that includes a reference for application data, library 312 determines the service cluster 302 that includes the application data store 308 having the partition that includes the application data. For example, a cache service request issued by application 131A (APP1) for cached application data may include a cache key identifying a cache record in an overall application data store 308. Based on the cache key, library 312 may determine the service cluster 302 that includes the application data store 308 for application 131A that stores the cache record for the cache key. In some examples, library 312 may apply, to a cache key in a service request from application 131A, a hashing function having a number of hash buckets corresponding to the number of server clusters 302 for application 131A, as specified by APP1 configuration data 314A. The hashing function resolves to one of the buckets, which is associated in library 312 with one of server clusters 302. Based on the resolution of the hashing function, library 312 may direct the cache service request to the associated server cluster 302 for processing by one of the servers of the server cluster.

In some examples, a cache key may uniquely identifier a user and in some cases may resolve to a user profile in one of application data stores 308. Using techniques described herein to facilitate application-level and application data-level multi-tenancy among user profiles for different applications may facilitate user load balancing among server clusters 302 for handling service requests for the various users. While described above with respect to a cache service, the operations described above may similarly apply to other services provided by an API and services engine 110 described herein.

Figure 5:
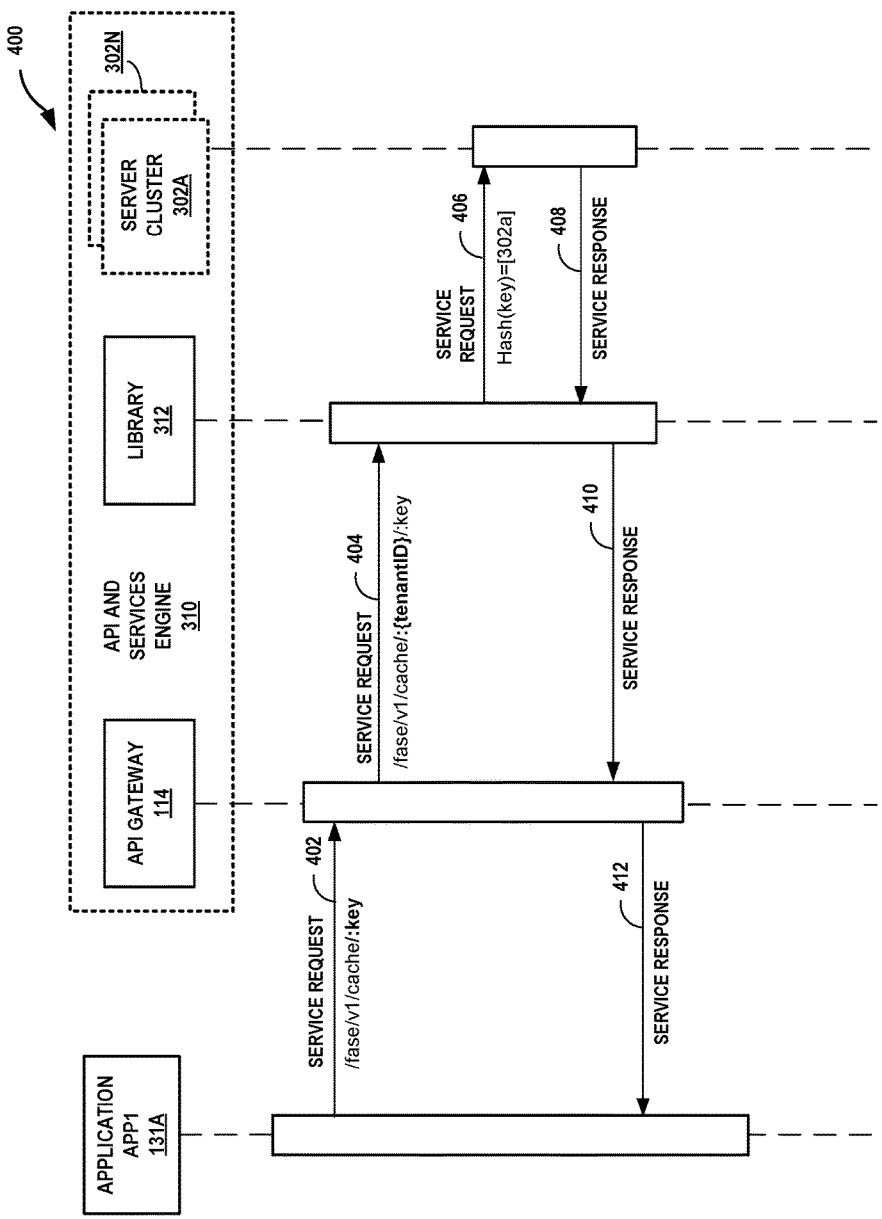
FIG. 5 is a conceptual diagram illustrating an example process flow for handling service requests by an API and services engine to provide multi-layer multi-tenancy, according to techniques described in this disclosure.

FIG. 5 is a conceptual diagram illustrating an example process flow for handling service requests by an API and services engine to provide multi-layer multi-tenancy, according to techniques described in this disclosure. Application 131A issues a cache service request 402 for a cache record identified by a cache key "key". Service request 402 may represent a request to perform a create, read, update, or delete operation with respect to a cache record in API and services engine 310. An HTTP command (e.g., GET, POST, PATCH, or DELETE) for service request 402 may determine the operation. API gateway 114 receives the cache service request 402 and determines the tenant identifier ("tenantID") for application 131A based on an authorization token embedded in the cache service request 402, then generates a cache service request for library 312 that has a URI that includes the tenant identifier. That is, in this example, API gateway 114 modifies the URI for cache service request 402 to generate a new URI for cache service request 404 having the tenant identifier.

Library 312, in this example, applies a hash function to the cache key ("key"), which resolves to server cluster 302A. Library 312 therefore sends data 406 for service request 404 to server cluster 302A for processing, e.g., by the appropriate cache service engine. Server cluster 302A applies the requested operation and provides data indicating a response 408. Library 312 provides an API conforming service response 410 to API gateway 114, which sends a corresponding service response 412 to application 131A.

Figure 6:
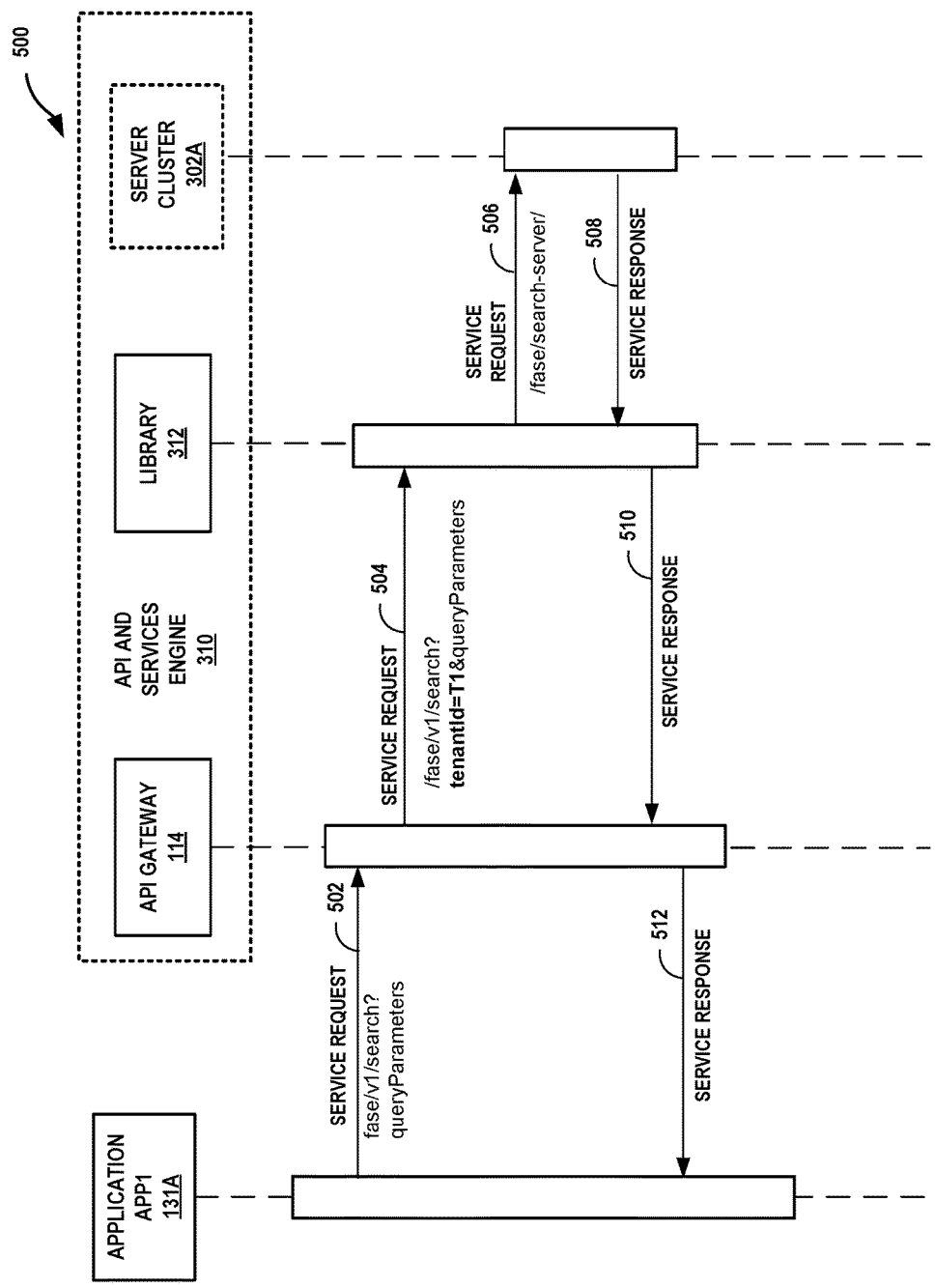
FIG. 6 is a conceptual diagram illustrating an example process flow for handling service requests by an API and services engine to provide application-level multi-tenancy, according to techniques described in this disclosure.

FIG. 6 is a conceptual diagram illustrating an example process flow for handling service requests by an API and services engine to provide application-level multi-tenancy, according to techniques described in this disclosure. Although described with respect to API and services engine 310, process 500 may be performed by API and services engine 110. Application 131A issues a search service request 502 for search results for a query having one or more search query parameters ("queryParameters"). API gateway 114 receives the search service request 502 and determines the tenant identifier ("tenantID=T1") for application 131A based on an authorization token embedded in the cache service request 502, then generates a search service request for library 312 that has a URI that includes the tenant identifier. That is, in this example, API gateway 114 modifies the URI for search service request 502 to generate a new URI for cache service request 504 having the tenant identifier. Library 312 determines a search engine with which to process the service request 504 based on the tenant identifier. In this case, the search engine is located at server cluster 302A, which processes the service request 504 and returns a service response 508 indicating the search results. Library 312 relays the service response 508 as service response 510 to API gateway 114, which relays service response 510 to application 131A as service response 512 indicating the search results.

Figure 7:
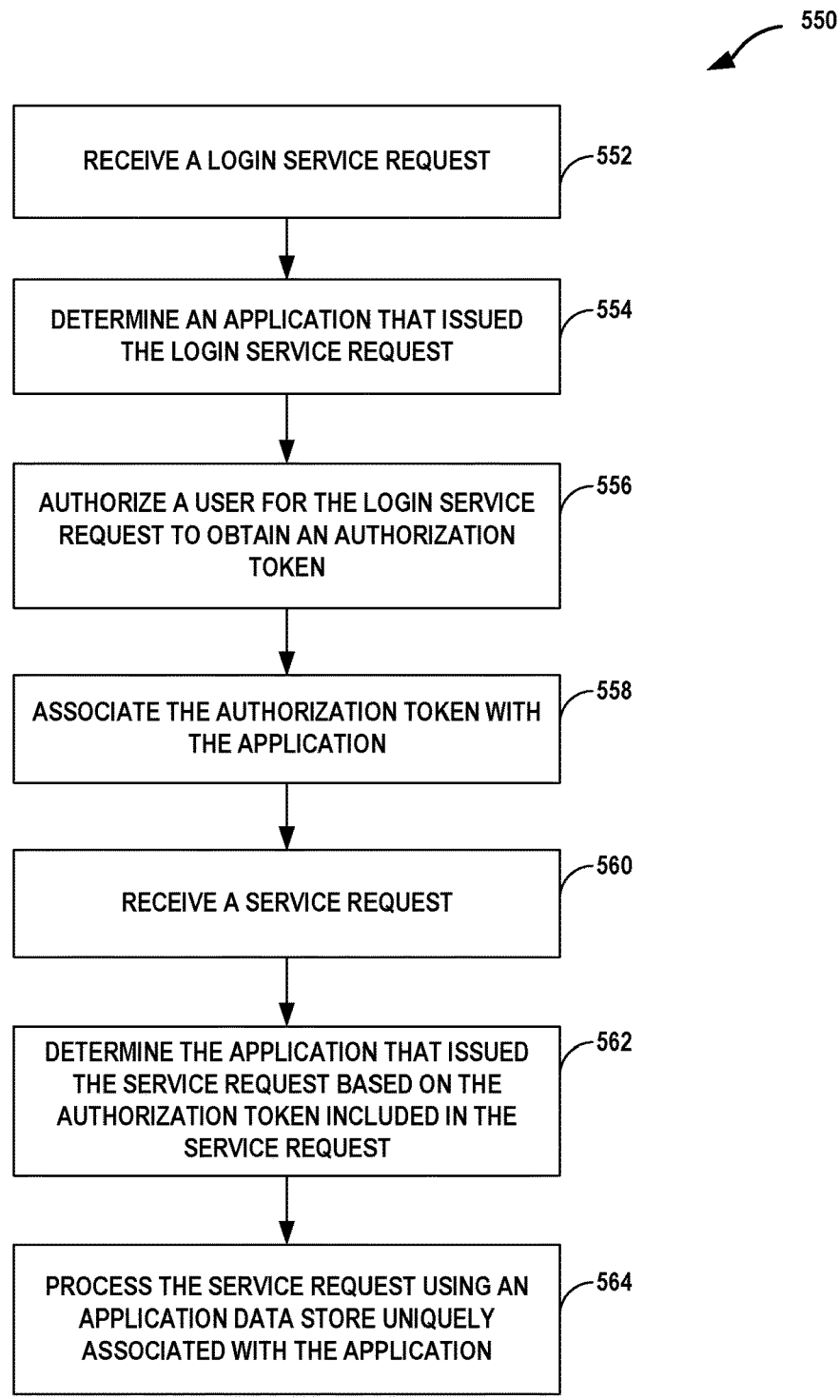
FIG. 7 is a flowchart illustrating an example mode of operation for an API and services engine according to techniques described in this disclosure.

FIG. 7 is a flowchart illustrating an example mode of operation for an API and services engine according to techniques described in this disclosure. While described with respect to API and services engine 110, mode of operation 500 may be performed by components of any API and services engine described in this disclosure.

API and services engine 110 receives a login service request from an application 131A (552). The login service request may include an API consumer key and/or an API consumer secret associated by API and services engine 110 with the application 131A. Based on such data included in the login service request, API and services engine 110 may determine that application 131A issued the login service request (554). The API and services engine 110 authorizes a user of application 131A, in some cases using identity server 126, in order to obtain an authorization token for the user (556). The API and services engine 110 associates the authorization token with the application and stores data indicating the association (558).

Upon subsequently receiving a service request that includes the authorization token (560), the API and services engine 110 identifies the application that issued the service request based on the association (562). The API and services engine 110 then processes the service using an application data store uniquely associated with the application. In this way, API and services engine 110 enables application-level multi-tenancy to support multiple applications accessing a plurality of service libraries each managing application data stores for the applications.

Figure 8:
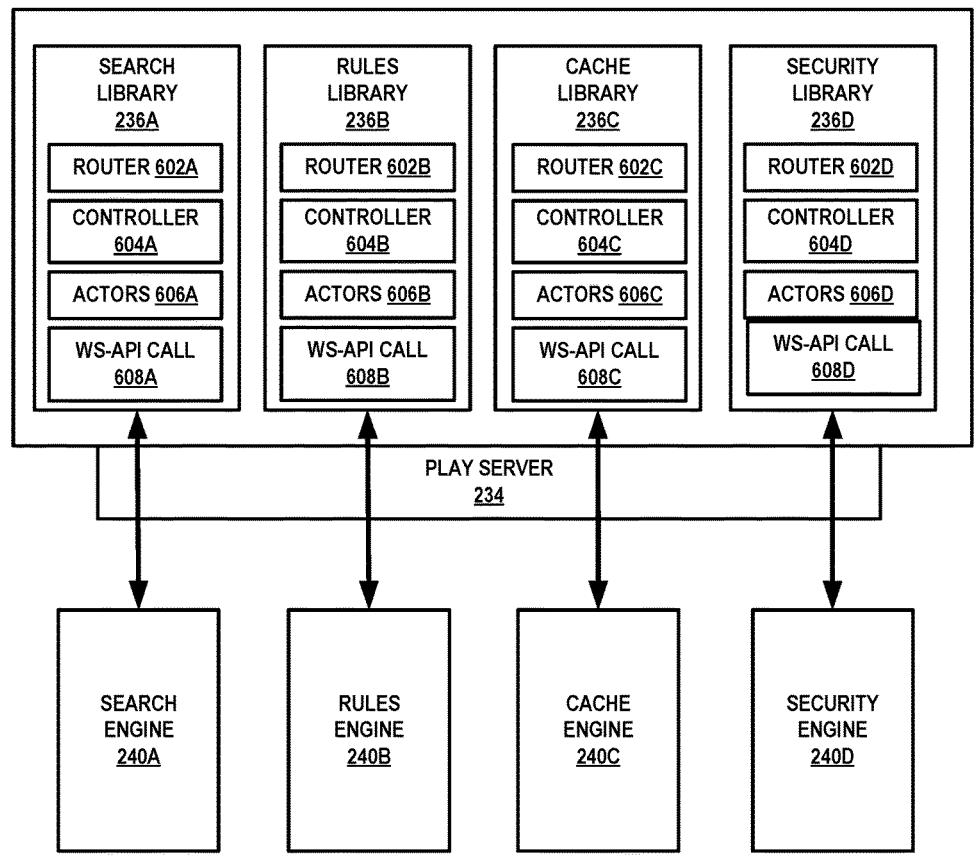
FIG. 8 is a block diagram illustrating example components of API and services engine of FIG. 3 in further detail, according to techniques described in this disclosure.

FIG. 8 is a block diagram illustrating example components of API and services engine 110 of FIG. 3 in further detail, according to techniques described in this disclosure. In this example, each library 136 includes a corresponding router 602, controller 604, actors 606, and web services API (WS-API) call module 608. The uniform architecture of libraries 136 may promote the rapid and template-based development of extensions to API and services engine 110 to include additional libraries for additional services. The operations of components of each of libraries 136 is described below with respect to search library 136A but may be similar for each of libraries 136.

Search library 136A may implement a microservices-based architecture, in some examples. Router 602A stores one or more routes that define application routes for service requests. When executed by search library 136A in response to a service request to the search library 136A API, router 602A directs the service request to a controller function of controller 604A based on the URI for the service request. Controller 604A includes one or more functions to invoke one or more actors 606A that invoke WS-API call module 608A to invoke HTTP services, provided by search engines 240A, from within the PLAY server 234 application, i.e., search library 236A.

In accordance with techniques described herein, multiple instances of search engine 240A manage respective application data stores for respective applications. The search engine 240A instances may be reachable with HTTP requests from PLAY server 234. Search library 236A may use the tenant identifier embedded in a service request from API gateway 114 to determine the URI for the search engine 240A instance that manages the application data store for the corresponding tenant application. WS-API call module 608A may generate and send an HTTP request to the determined URI, which resolves to the search engine 240A instance. The HTTP request may include application data for storage to the data store.

Figure 9:
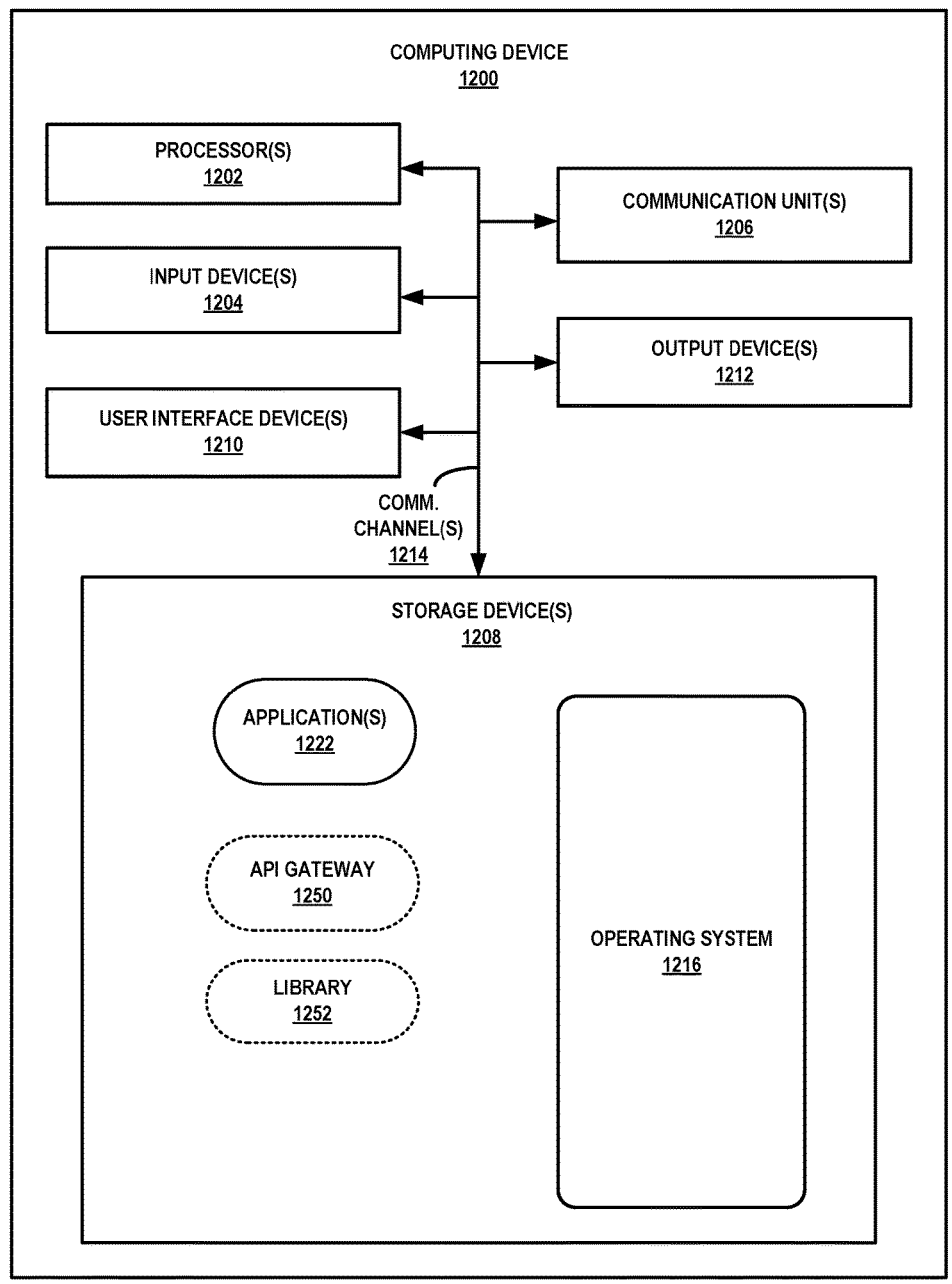
FIG. 9 is a block diagram illustrating further details of one example of a computing device that operates in accordance with one or more techniques of the present disclosure.

FIG. 9 is a block diagram illustrating further details of one example of a computing device that operates in accordance with one or more techniques of the present disclosure. FIG. 9 may illustrate a particular example of a server or other computing device 1200 that includes one or more processor(s) 1202 for executing, e.g., an API gateway and/or a service library according to any of the examples described herein. Other examples of computing device 1200 may be used in other instances. Although shown in FIG. 9 as a stand-alone computing device 1200 for purposes of example, a computing device may be any component or system that includes one or more processors or other suitable computing environment for executing software instructions and, for example, need not necessarily include one or more elements shown in FIG. 9 (e.g., communication units 1206; and in some examples components such as storage device(s) 1208 may not be co-located or in the same chassis as other components). Computing device 1200 may be located and execute, for example, within a private, public, or hybrid cloud, in a data center.

As shown in the specific example of FIG. 9, computing device 1200 includes one or more processors 1202, one or more input devices 1204, one or more communication units 1206, one or more output devices 1212, one or more storage devices 1208, and user interface (UI) device 1210, and communication unit 1206. Computing device 1200, in one example, further includes one or more applications 1222, application delivery monitor application 1224, and operating system 1216 that are executable by computing device 1200. Each of components 1202, 1204, 1206, 1208, 1210, and 1212 are coupled (physically, communicatively, and/or operatively) for inter-component communications. In some examples, communication channels 1214 may include a system bus, a network connection, an inter-process communication data structure, or any other method for communicating data. As one example, components 1202, 1204, 1206, 1208, 1210, and 1212 may be coupled by one or more communication channels 1214.

Processors 1202, in one example, are configured to implement functionality and/or process instructions for execution within computing device 1200. For example, processors 1202 may be capable of processing instructions stored in storage device 1208. Examples of processors 1202 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 1208 may be configured to store information within computing device 1200 during operation. Storage device 1208, in some examples, is described as a computer-readable storage medium. In some examples, storage device 1208 is a temporary memory, meaning that a primary purpose of storage device 1208 is not long-term storage. Storage device 1208, in some examples, is described as a volatile memory, meaning that storage device 1208 does not maintain stored contents when the computer is turned off. Examples of volatile memories include random access memories (RAM), dynamic random access memories (DRAM), static random access memories (SRAM), and other forms of volatile memories known in the art. In some examples, storage device 1208 is used to store program instructions for execution by processors 1202. Storage device 1208, in one example, is used by software or applications running on computing device 1200 to temporarily store information during program execution.

Storage devices 1208, in some examples, also include one or more computer-readable storage media. Storage devices 1208 may be configured to store larger amounts of information than volatile memory. Storage devices 1208 may further be configured for long-term storage of information. In some examples, storage devices 1208 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 1200, in some examples, also includes one or more communication units 1206. Computing device 1200, in one example, utilizes communication units 1206 to communicate with external devices via one or more networks, such as one or more wired/wireless/mobile networks.

Communication units 1206 may include a network interface card, such as an Ethernet card, an optical transceiver, a radio frequency transceiver, or any other type of device that can send and receive information. Other examples of such network interfaces may include 3G and WiFi radios. In some examples, computing device 1200 uses communication unit 1206 to communicate with an external device.

Computing device 1200, in one example, also includes one or more user interface devices 1210. User interface devices 1210, in some examples, are configured to receive input from a user through tactile, audio, or video feedback. Examples of user interface devices(s) 1210 include a presence-sensitive display, a mouse, a keyboard, a voice responsive system, video camera, microphone or any other type of device for detecting a command from a user. In some examples, a presence-sensitive display includes a touch-sensitive screen.

One or more output devices 1212 may also be included in computing device 1200. Output device 1212, in some examples, is configured to provide output to a user using tactile, audio, or video stimuli. Output device 1212, in one example, includes a presence-sensitive display, a sound card, a video graphics adapter card, or any other type of device for converting a signal into an appropriate form understandable to humans or machines. Additional examples of output device 1212 include a speaker, a cathode ray tube (CRT) monitor, a liquid crystal display (LCD), or any other type of device that can generate intelligible output to a user.

Computing device 1200 may include operating system 1216. Operating system 1216, in some examples, controls the operation of components of computing device 1200. For example, operating system 1216, in one example, facilitates the communication of one or more applications 1222, API gateway 1250, and/or library 1252, with processors 1202, communication unit 1206, storage device 1208, input device 1204, user interface devices 1210, and output device 1212.

Application 1222, API gateway 1250, and library 1252 may also include program instructions and/or data that are executable by computing device 1200. API gateway 1250 and library 1252 are each illustrated with dashed lines to indicate that these may or may not be executable by any given example of computing device 1200.

API gateway 1250 may represent an example instance of API gateway 114 or any other API gateway described herein. API gateway 1250, when executed by computing device 1200, may enable application-level multi-tenancy by mapping authorization tokens to application/tenant identifiers. Library 1252 may represent an example of any service libraries 136, 236, 312, or any other service library described herein. Library 1252, when executed by computing device 1200, may enable application-level multi-tenancy by directing a service request, which includes an application/tenant identifier embedded therein by an API gateway, to an application-specific application data store uniquely associated with the application/tenant identifier and the identified application or application service.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A method comprising:
   determining, by an application programming interface (API) and services engine in response to receiving a service request from an application, an application identifier for the service request based at least on an authorization token included in the service request, wherein the application identifier identifies an application that issued the service request;
   selecting, by the API and services engine based at least on an association, stored by the API and services engine, of the application identifier and the authorization token, an application data store uniquely associated with the application that issued the service request; and
   processing, by the API and services engine, the service request using data stored by the selected application data store.

2. The method of claim 1, further comprising:
   receiving, by the API and services engine from the application via a login API, a login service request for a user, wherein the login service request includes at least one of an API consumer key and an API consumer secret; and
   determining, by the API and services engine based at least on the one of the API consumer key and the API consumer secret, that the application issued the login service request.

3. The method of claim 2, further comprising:
obtaining, by the API and services engine in response to authorizing the user responsive to the login service request, the authorization token; and
storing, by the API and services engine, the association of the authorization token and the application identifier for the application,
wherein determining the application identifier for the service request comprises determining, by the API and services engine based at least on the association and the authorization token, the application identifier for the service request.

4. The method of claim 1, wherein the service request does not include the application identifier.

5. The method of claim 4, further comprising:
sending, by an API gateway of the API and services engine to a service library of the API and services engine and via a library API, a modified service request that includes the application identifier and includes data from the service request.

6. The method of claim 5, wherein the application identifier comprises an application data store name for the application data store.

7. The method of claim 1, further comprising:
receiving, by a service library of the API and services engine from an API gateway of the API and services engine and via a library API, a modified service request that includes the application identifier, includes data from the service request, and specifies a service,
wherein selecting the application data store uniquely associated with the application that issued the service request comprises determining, by the service library based on configuration data that associates the application identifier to a service engine for the service, the service engine that manages the application data store uniquely associated with the application that issued the service request,
wherein processing the service request comprises processing, by the service engine, the modified service request using the application data store uniquely associated with the application that issued the service request.

8. The method of claim 1,
wherein the API and services engines comprises a plurality of server clusters, each server cluster of the plurality of server clusters comprising a service engine for a service specified by the service request and storing a different partition of the application data store uniquely associated with the application that issued the service request, the method further comprising:
receiving, by a service library of the API and services engine from an API gateway of the API and services engine and via a library API, a modified service request that includes the application identifier and includes data from the service request;
applying a hash function to the data from the service request to determine a server cluster of the plurality of clusters with which to process the modified service request; and
sending, by the service library to the server cluster, the data from the service request.

9. The method of claim 8,
wherein the service request comprises a first service request,
wherein the server cluster comprises a first server cluster, the method further comprising:
determining, by the API and services engine in response to receiving a second service request from the application, an application identifier for the second service request based at least on an authorization token included in the second service request, wherein the application identifier identifies the application that issued the second service request;
receiving, by the service library of the API and services engine from the API gateway of the API and services engine and via the library API, a second modified service request that includes the application identifier for the second service request and includes data from the second service request;
applying the hash function to the data from the second service request to determine a second server cluster of the plurality of clusters with which to process the second modified service request; and
sending, by the service library to the second server cluster, the data from the second service request.

10. The method of claim 1,
wherein the API and services engine comprises a plurality of application data stores, and
wherein the API and services engine comprises configuration data that uniquely associates each of the application data stores to a different application served by API and services engine.

11. The method of claim 1,
wherein API and services engine comprises a plurality of service libraries, including the service library, for respective services, and
wherein the services comprise two or more of search, cache, rules, security, and data storage.

12. The method of claim 1, further comprising:
receiving, by an API gateway of the API and services engine, the service request, wherein the service request does not include the application identifier; and
mapping, by the API gateway based on an authorization token-application map, the authorization token to the application name;
mapping, by the API gateway based on an application-tenant identifier map, the application name to the application identifier to obtain the association of the application identifier and the authorization token; and
sending, by the API gateway to a service library of the API and services engine and via a library API, a modified service request that includes the application identifier and includes data from the service request.

13. The method of claim 1,
wherein the application comprises a first application,
wherein the service request comprises a first service request,
wherein the application data store comprises a first application data store,
wherein the application identifier comprises a first application identifier, the method further comprising:
determining, by the API and services engine in response to receiving a second service request from a second application, a second application identifier for the second service request based at least on an authorization token included in the second service request, wherein the second application identifier identifies the second application that issued the second service request;
selecting, by the API and services engine based at least on an association, stored by the API and services engine, of the second application identifier and the authorization token included in the second service request, a second application data store uniquely associated with the second application that issued the second service request; and processing, by the API and services engine, the second service request using data stored by the selected second application data store.

14. An application programming interface (API) and services engine, comprising:
one or more programmable processors operably coupled to at least one memory, the at least one memory configured with instructions for causing the one or more programmable processors to:
determine, in response to receiving a service request from an application, an application identifier for the service request based at least on an authorization token included in the service request, wherein the application identifier identifies an application that issued the service request;
select, based at least on an association, stored by the API and services engine, of the application identifier and the authorization token, an application data store uniquely associated with the application that issued the service request; and
process the service request using data stored by the selected application data store.

15. The API and services engine of claim 14, wherein the at least one memory is configured with instructions for causing the one or more programmable processors to:
receive, from the application via a login API, a login service request for a user, wherein the login service request includes at least one of an API consumer key and an API consumer secret; and
determine, based at least on the one of the API consumer key and the API consumer secret, that the application issued the login service request.

16. The API and services engine of claim 15, wherein the at least one memory is configured with instructions for causing the one or more programmable processors to:
obtain, in response to authorizing the user responsive to the login service request, the authorization token; and
store the association of the authorization token and the application identifier for the application, wherein determining the application identifier for the service request comprises determining, by the API and services engine based at least on the association, the application identifier for the service request.

17. The API and services engine of claim 14, wherein the service request does not include the application identifier.

18. The API and services engine of claim 14, further comprising:
a service library of the API and services engine; and
an API gateway of the API and services engine, the API gateway configured for execution by the one or more programmable processors to send, to a service library of the API and services engine and via a library API, a modified service request that includes the application identifier and includes data from the service request,
wherein the service library is configured for execution by the one or more programmable processors to process the modified service request using data stored by the selected application data store.

19. The API and services engine of claim 18, wherein the application identifier comprises an application data store name for the application data store.

20. A non-transitory computer-readable medium comprising instructions for causing one or more programmable processors for an application programming interface and services engines to perform operations comprising:
determining, in response to receiving a service request from an application, an application identifier for the service request based at least on an authorization token included in the service request, wherein the application identifier identifies an application that issued the service request;
selecting, based at least on an association, stored by the API and services engine, of the application identifier and the authorization token, an application data store uniquely associated with the application that issued the service request; and
processing the service request using data stored by the selected application data store.

* * * * *